United States Patent Office 3,123,626
Patented Mar. 3, 1964

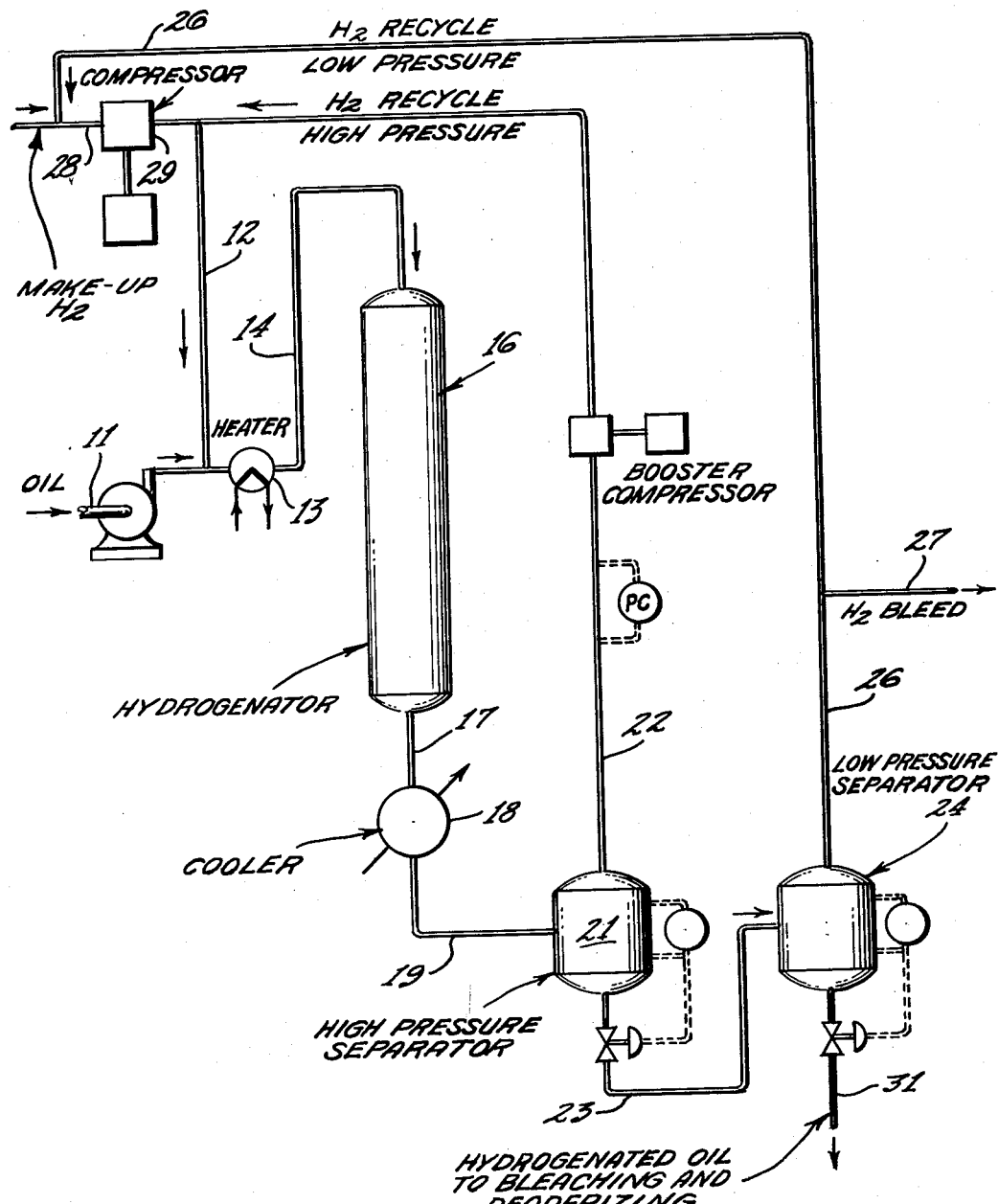

3,123,626
SELECTIVE HYDROGENATION OF FATS AND FATTY OILS
Francis William Kirsch, Wilmington, Del., assignor to Air Products and Chemicals, Inc., a corporation of Delaware
Filed Sept. 30, 1960, Ser. No. 59,613
9 Claims. (Cl. 260—409)

This invention concerns fat hydrogenation. It is more particularly concerned with the selective hydrogenation of edible fats and oils and with a procedure of the type in which hydrogen and fatty charge are passed continuously over a fixed bed of catalyst conducive to the satisfactory production of commercially acceptable, partially hydrogenated fats of the type suitable for use in shortenings and/or margarine.

The preparation and use of hydrogenated vegetable oils and the like has a respected history of development covering more than half a century. Many methods of operation and large numbers of agents for the catalysis of the hydrogenation to achieve the desired end products have been proposed during this period. Naturally only a relative few of both operational methods and catalysts have proven commercially acceptable and successful. At the present time substantially all of the commercial operations utilize "batch operation" methods of effecting the desired type and degree of hydrogenation. In such batch operations the customary procedure involves the admixture with the fat of a reasonably small quantity of hydrogenation catalyst which may or may not be supported and which may or may not be associated with a type of absorbent material, such as natural earths and clays including diatomaceous earth and kieselguhr, which act more or less entirely as filter aids.

Inasmuch as nickel is one of the most widely used catalytic agents and in its commercially effective state is of practically colloidal nature, the absorbent filter aid material is a necessary adjunct in aiding in the flocculation and congolomeration of such nickel for its necessary removal, usually by filtration, from the final hydrogenation product. It appears that the associated absorbent material or support agents usually have little effect on the catalytic nature of the nickel or other catalystic agent associated therewith or carried therein and that the main purpose therefore is that of a filter aid and flocculation agent.

Typical catalysts employed in such systems are usually available in a form prepared by suspending the active catalytic agents in a relative small amount of a suitable oil which is hardened to protect the catalyst from deactivants before and during storage, transportation and introduction to the hydrogenation system. As is readily understood, the batch operation is of the unitary operation type wherein the batch of ingredients is introduced into a confined zone, reacted therein, and then removed. In such batch operations the controllable variables are generally limited to the pressure, temperature, time, and degree of agitation. A factor of somewhat less appreciable control as a variable is the kind and quantity of the catalytic agents employed in the system.

Edible oils must meet certain rather stringent specifications in their hydrogenated form and included in those specifications are certain physical attributes which are demanded by the trade. Of these the melting point and plastic range are of considerable importance. In general, it may be said that the margarines have a relatively high melting point in order to maintain shape and consistency at normal room temperatures and must have a relatively short plastic range before they become liquid. Margarines generally melt completely by or preferably below a temperature of 104° F. The shortening agents, on the contrary, generally have a broader plastic range and require temperatures above 104° F. to effect complete liquefaction. The factors of considerable importance in the control of these physical attributes in decreasing order are: first, the relationship of the unsaturates, mono-, di-, and tri-forms, to the completely saturated forms inasmuch as the hardness increases with a decrease in unsaturation and particularly with an increase in saturates; secondly, the double bond characteristics in the trans- and cis-forms (for example, the trans-form triolein (or trielaidin) has a melting point of approximately 42° C. whereas the cis-form material has a melting point of about 5° C.); thirdly, the position of the double bonds with respect to their separation from the carboxyl groups affects the hardness in that the melting point decreases with increasing distance of separation (it is of interest to note that with $C_{18}$ fatty acids a shift of double bond position of at least 7–8 carbon atoms is equivalent in effect on the melting point to one change from the cis- to the trans-position); and lastly, though somewhat little established by firm information, is the positioning of fatty acid groups in the alpha, beta and alpha prime positions of the glyceride.

As indicated above, most commercial operation has been limited to the batch type operations, but many serious efforts have been made to permit the development of some suitable continuous process in which the charge is introduced, processed, and recovered without discontinuance such as is necessary in a batch type operation. One variation, of such systems, which has probably come the closest to commercial usage is that in which catalyst is circulated through the system with and suspended in the fats, and the catalyst is continuously recycled through the system after being separated from hydrogenated product as by final filtration. Filtration problems, however, are of considerable magnitude because of the extremely fine size of the catalyst and the necessity of removing substantially all of the catalyst from the product. Substantially all of the known catalysts have been tried in attempts to develop a continuous process without, however, reaching the final state of a really acceptable commercial method equalling or supplanting batch type operation.

The reasons in back of the drive to develop a suitable continuous process of the kind represented by this invention included substantial labor savings, space and time savings, simplified equipment and operating conditions, the avoidance of the need to filter the catalyst out of the final product and perhaps some saving in the catalyst quantity requirements per unit amount of fat and oil treated.

It has now been found that a continuous process for selective hydrogenation of edible fats and oils is possible with all of the attendant benefits mentioned above, and with the attainment of at least the quality of product heretofore known to be available only in batch type operation.

One of the chief requirements of a hydrogenation process applicable to edible oils is "selectivity" of reaction. Selectivity concerns and depends on the conversion of the poly-unsaturate groups within the glyceride molecule to a lower degree of unsaturation without producing any substantial amount of attendant total hydrogenation. For example, a linoleate ($C_{18}$, with two double bonds) may be said to be selectively hydrogenated when the chief product is an oleate ($C_{18}$, with one double bond) rather than a stearate ($C_{18}$, with no double bonds). It is now possible with this invention to continuously hydrogenate edible fats and oils to products of acceptable partial saturation and of commercially desirable iodine value without substantial increase in the amount of total saturates in the product. One of the reasons making this process possible resides in the discovery of a nickel-containing catalyst of unique form and preparation as well as composition.

In accordance with this invention continuous hydrogenation with improved selectivity, including the capacity to selectively conjugate the polyethenoid bonds to selectively hydrogenate edible fats and oils, is obtained under closely controlled conditions and in the presence of a unique hydrogenation catalyst. The contacting conditions include temperatures in the range of 100–400° F.; pressures, measured as free hydrogen, in the range of 10 to 150 lbs./sq. in. gauge (p.s.i.g.); contact time in the order of 0.25 to 10 hours controlled by liquid hourly space velocity in the range of 0.1 to 4.00 (LHSV). The charge at these conditions is contacted with a fixed bed of catalyst which comprises a powder-included macroporous silica support associated with an active hydrogenation component obtained from nickel sulfate comprising nickel with anionic sulphur present in a ratio of 5 to 30 parts by weight nickel to one of sulfur (i.e., 0.13 to 4.99% by weight of sulfur based on the final catalyst) and further characterized in that the pore structure of the catalyst contains at least 15% of its pores with an average diameter in the order of at least 100 A.

The catalysts of this invention are particularly effective in promoting the desired type and extent of selective hydrogenation. The reasons underlying their particular effectiveness are not completely known; but it is known that when these catalysts are prepared and used in the proper manner, results are obtained which are otherwise unattainable at the present state of development in this field. The siliceous support is suitably of the type whose preparation is set forth and described in copending application Serial No. 812,109, filed May 11, 1959, now abandoned, further characterized in the nature of the pore structure. In the catalyst of this invention both the nickel and the sulfur components are incorporated simultaneously through the use of nickel sulfate in suitable amounts as an impregnate. Further characterization resides in that prior to use and during use in the fat hydrogenation reaction there is no less than about 4% nickel by weight of the catalyst. More than 25% nickel by weight of the catalyst is neither desirable nor practical. Such a catalyst has been found more selective for continuous operation and has surprisingly good hydrogenative and conjugation functions. It must be remembered that the nickel-sulfur distribution has to be balanced carefully within the defined ranges because sulfur in unsuitably large amounts readily poisons the nickel function and likewise exerts some catalytic effect in the trans-iomer formation.

Reduction of the nickel sulfate in the catalyst is effected at temperatures in the range of about 900° to 1025° F. for a time within the range of at least two hours up to about 72 hours and in an atmosphere comprising hydrogen. The hydrogen atmosphere is preferably flowing at a velocity sufficient to remove the gaseous products of the reduction and in such manner that the reduction is relatively uniform throughout the mass of catalyst being reduced. In reducing (hydrogenating) the catalyst containing nickel and sulfate a portion of the sulfur is apparently removed by decomposition to hydrogen sulfide or other volatile sulfur compound, leaving nickel/sulfur in a ratio higher than that of $NiSO_4$. The precise manner in which the remaining sulfur is associated with the nickel has not been conclusively determined, but analysis and tests carried out lead to the belief that at least most of the remaining sulfur is no longer in the sulfate form; a portion of the nickel, accordingly, has probably been reduced to metallic state to account for the observed Ni/S ratio. Catalysts obtained by partial sulfidation of supported nickel catalyst, such as that from reduced nickel formate, have been found only partially useful in the described continuous hydrogenation process and do not possess the superior activity and selectivity of the catalysts obtained by hydrogen reduction of nickel sulfate.

The superior nature of the catalysts of the invention is well established in that with the use thereof continuous operation is now possible in hydrogenation of edible fats and oils.

In an earlier filed co-pending application, Serial No. 812,138, filed May 11, 1959, the description of the manufacture and use of a superior fat hydrogenation catalyst is set forth. In such identified application it is shown that nickel, obtained from nickel formate impregnating solution, supported on a powder-included silica gel of large pore size is superior to previously available materials in certain aspects in the provision of a highly acceptable catalyst material for the hydrogenation of certain fats and oils. However, the present catalyst is superior in its particular field even to this material. Where the nickel formate catalyst is used in a continuous system for the hydrogenation of edible fats and oils with their strict product specifications, such catalyst is found to be relatively non-selective and indiscriminate in the reactions therein promoted so that the product which becomes hydrogenated contains a substantially larger amount of saturated groups. Thus the diethenoid groups are substantially reduced in amount, and the monoethenoids are either not formed or are hydrogenated almost as rapidly as they are formed. Such a reaction is acceptable when hardness and solids content of the product is less important—such as the hydrogenation to inedible products. One of the unique findings in connection with the nickel formate derived catalyst is that in the batch type operation with stirring or agitation, hydrogenation may be effected in a selective manner to a measurable degree; whereas, in the continuous system it is found that the nickel formate derived catalyst is largely non-selective. On the contrary, the new catalyst of this invention in continuous systems is more selective to a level of about 80–90% at conversion levels sufficiently high to give a product of 70 iodine value from a cottonseed oil with an initial iodine value of about 109.

The contact time is important in that at contact times less than above indicated there is insufficient and unbalanced hydrogenation, and at contact times too extended the degree and kind of hydrogenation are excessive and undesirable. With regard to the temperature, it is easily noted that requirements for the continuous process of this invention and the desired degree of selective hydrogenation and isomer content are at temperature levels generally appreciably below those normally employed in the commercial batch type operations; or at comparable temperatures these objectives are obtained in a shorter time of reaction. Hydrogen requirements necessary to provide the required amount of hydrogen to effect the selective hydrogenation, as well as the total pressure requirements, are moderate. While there is a certain amount of leeway in the required amount of hydrogen such that higher quantities of hydrogen above the 150 p.s.i.g. hydrogen pressure may be tolerated at the lower temperature and at higher space rate conditions, and lower hydrogen requirements than the 10 p.s.i.g. may be tolerated at high temperatures and longer contact times, the preferred operating range is within about 25 to 100 p.s.i.g. hydrogen pressure.

A matter of appreciable effect on the ultimate quality of the product obtained in the continuous hydrogenation of these edible fats and oils pertains to the state and nature of the charge stock. The natural oils, as expressed, contain certain impurities which are preferably removed before subjecting such oils to the hydrogenation reaction. For example, water and oxidizing agents present in the oils adversely affect the reaction and cause more rapid deactivation of the catalyst. Thus it is desirable to treat the refined charge stock in the well-known manner called bleaching, which is a contact filtration in an inert atmosphere, which tends to remove most solids and an appreciable amount of the water and certain color bodies falling outside the range of materials on which the hydrogenation treatment is preferably performed. A further step in the treatment of these charge stocks comprises vacuum treatment at an elevated temperature and moderate period of time, such as at least two hours to no more than six hours at a temperature in the range of 220–350° F. and under vacuum conditions, such as a total pressure of less than 0.25 atmosphere absolute. In any event the charge should contain no more than 40 parts per million of water and should have a peroxide value (milliequivalents of peroxide per kilogram of charge) of less than 20.

Referring now to FIGURE 1, a continuous operation for the hydrogenation of refined edible oil is set forth diagrammatically. It is to be understood that this presentation is illustrative only of the nature of the operation rather than limiting; and that the scope of the invention is consistent with the disclosure within the terminology of the claims appended hereto. In FIGURE 1, bleached and vacuum treated cottonseed oil is introduced at a rate of 5000 pounds per hour through line 11 into admixture with hydrogen in an amount equal to three mols of hydrogen per mol of oil, such hydrogen being introduced through line 12. The admixture is then passed through heat exchanger 13, in which the temperature is raised to approximately 200° F., and then through charge line 14 into reactor 16. The conditions in reactor 16 are approximately 50 p.s.i.g., an average temperature of about 235° F., 1 LHSV, and hydrogen/oil ratio of 3.

The catalyst employed in reactor 16 is one prepared by impregnating a powder-included silica bead with sufficient nickel sulfate such that after drying and calcination at 1000° F. for two hours in a 100% hydrogen atmosphere it has a composition of approximately 13% nickel and 1.6% sulfur by weight; further characterized in that 10% of the pores have an average diameter greater than 170 A.

The product from the hydrogenator reactor 16 is removed through line 17 and passes through the temperature adjusting means 18 wherein the product temperature is reduced to approximately 100° F. The temperature adjusted stream passes through line 19 into a first separator 21 wherein the high pressure conditions of the reaction are maintained except for normal pressure drop; and the effluent gases comprising hydrogen suitable for recycle are separated and removed through line 22 at a pressure of approximately 35 p.s.i.g. for return as desired for reuse, and can be adjusted in pressure and introduced into line 12 for return to the system. The residual portion from which the high pressure gas has been removed leaves the first separator 21 through line 23 and enters the low pressure separator 24.

In the low pressure separator 24, operated at approximately 2 to 3 p.s.i.g, the normally gaseous products are further removed through line 26 and constitute mainly hydrogen which in large part is suitable as recycle gas upon repressuring in such quantities as may be desired or required. A withdrawal line 27 permits removal from line 26 of extraneous quantities of hydrogen as may be desired. The low pressure gas of line 26 returned for recycle purposes is introduced to the makeup hydrogen line 28 for pressuring in the pressure system 29 to the 50 p.s.i.g. of the main reaction system. For the particular system described approximately 3,740 s.c.f.h. of hydrogen is added to maintain a suitable hydrogen balance. Hydrogenation product freed of gaseous material in low pressure separator 24 is removed through line 31 for further treatment as may be desired or required, including bleaching, dedorizing and/or blending with other components to obtain a desired melting point, plastic range or other physical characteristics.

A better understanding of the invention can be obtained by referring to the following examples which further exemplify the potentialities and the desirabilities of the continuous hydrogenation system now made possible.

EXAMPLE I

A catalyst was prepared in the following manner.

The support was 100% silica hydrogel with about 25% (dry) silica gel powder included. This was prepared from an aqueous sodium silicate solution containing the slurried silica gel admixed with an aqueous solution of sulfuric acid to a pH of about 9. The admixture was passed in droplet form into a hydrocarbon bath in which the hydrosol set to hydrogel of generally spheroidal form. The formed beads were separated from the oil bath, washed with water, then base exchange treated with aqueous ammonium nitrate solution to aid in sodium removal, and then washed with ion-free water until no further nitrate ions were detectable in the wash water. The beads were then oven dried in a live steam atmosphere at 300° F. for two hours. The recovered dry beads had a bulk density of 0.46. The dry beads were then calcined at 1050° F. for two hours in a flowing stream of dry air.

A portion of the calcined beads was comminuted and 500 cc. of 20–60 mesh material was impregnated by immersion in a solution of 177 g. of nickel sulfate

$$(NiSO_4 \cdot 6H_2O)$$

dissolved in distilled water to a volume of 430 cc. The beads and solution were stirred during the one hour immersion time after which excess solution was drained off and the impregnated material was oven dried at 250° F. for three hours. This impregnated and dried material was calcined and reduced at 1000° F. in the presence of flowing hydrogen for two hours, cooled to room temperature in a hydrogen atmosphere and stored in a hydrogen atmosphere until employed in the catalysis of the selective hydrogenation of edible oils. The analysis of the catalyst showed the presence of 13.22% nickel and 1.62% sulfur, both by weight of the reduced catalyst. Pore size measurement indicated the presence of approximately 12% of the total pores present in the catalyst as in the range of 175 A. and larger.

EXAMPLE II

The catalyst of Example I was employed in the continuous hydrogenation of a cottonseed oil at conditions including a temperature of 235–250° F., 50 p.s.i.g., LHSV of 1 and a hydrogen to oil molar ratio of 6. The results of this operation appear in the following table which presents data on the charge stock in column 1; in column 2 the data on the product of the run in Example II; and the product of typical commercial batch operation in column 3.

Table 1

| | Charge Stock | Prod. of Ex. II | Typical Batch Commercial Operation |
|---|---|---|---|
| I.V. | 108.5 | 77.1 | 75–80 |
| F.F.A., percent | 0.05 | 0.04 | 0.1 |
| Halphen | Positive | Negative | Negative |
| Wiley M.P., °C | | 39.2 | <40 |
| Hardness Penetration, 90° F. | | 206 | >100 |
| Composition: | | | |
| Myristate | 0.9 | 0.7 | 1 |
| Palmitate | 26.6 | 27.4 | 27 |
| Stearate | 1.8 | 4.5 | 4 |
| Palmitoleate | 0.3 | 0.0 | |
| Oleate | 16.7 | 46.2 | 46 |
| Linoleate | 53.7 | 21.2 | 22 |
| | 100.0 | 100.0 | 100 |
| Conversion | | 60.5 | 59 |
| Selectivity | | 89.8 | 92 |

From the data above it is evident that the product from the continuous hydrogenation operation is now of high quality similar to that obtained by the batch method. Such results prior to the development of this catalyst and method were unavailable in continuous operation.

EXAMPLE III

Vacuum treatment of several batches of cottonseed oil for at least two hours at various temperatures in the range of 220 to 300° F. removed both air and water. Water content was lowered to less than 40 p.p.m. in the product in all instances from the charge stocks which contained as high as 870 p.p.m.; and the peroxide values of the products were 10 or less. In one sample treated at 220° F. for three hours in vacuo the product upon hydrogenation over the nickel catalyst had an iodine value of 30-numbers less than a comparable hydrogenation product from the untreated oil. The reaction conditions were the same in both hydrogenation runs and included a temperature of 260° F., LHSV of 2, and a hydrogen to oil ratio of 6 (molar).

EXAMPLE IV

Typical continuous hydrogenation of cottonseed oil over the catalyst of Example I at the conditions indicated below in Table 2 gave the results shown.

Table 2

|  | Cottonseed oil dried at 300° F. | | | Cottonseed oil dried at 220° F. | | |
|---|---|---|---|---|---|---|
| Conditions: | | | | | | |
| Temperature, °F | 234 | 236 | 236 | 252 | 299 | 224 |
| Pressure, p.s.i.g | 50 | 50 | 50 | 50 | 50 | 50 |
| LHSV | 1.0 | 0.5 | 2.0 | 1.0 | 1.0 | 1.0 |
| Iodine Value | 79.0 | 66.6 | 92.6 | 79.6 | 69.9 | 89.8 |
| Compostion: | | | | | | |
| Sat | 30.9 | 35.2 | 30.7 | 30.6 | 31.6 | 30.2 |
| Mono-unsat | 46.3 | 54.8 | 34.4 | 47.0 | 57.5 | 37.5 |
| Di-unsat | 22.8 | 10.0 | 34.9 | 22.4 | 10.9 | 32.3 |
| Conversion | 57.3 | 81.3 | 34.7 | 58.0 | 79.6 | 39.5 |
| Selectivity | 88.5 | 82.8 | 83.0 | 90.7 | 90.8 | 96.4 |

Similar beneficial results have been obtained in the hydrogenation of other glycerides of the edible oil type.

Obviously, many modifications and variations of the invention as hereinbefore set forth may be made without departing from the spirit and scope thereof, and therefore only such limitations should be imposed as are indicated in the appended claims.

What is claimed is:

1. The method of selectively hydrogenating glyceride edible fats and oils in continuous operation, which comprises passing such glyceride through a fixed bed of solid hydrogenation catalyst at conditions of severity corresponding to a temperature in the range of 100 to 400° F., at a hydrogen pressure of 10 to 150 pounds per square inch gauge and at a liquid hourly space velocity of 0.1 to 4, said solid hydrogenation catalyst comprising a macroporous silica support associated with nickel and sulfur derived from nickel sulfate by hydrogen reduction, said nickel and sulfur being present in the range of 0.13 to 4.99% by weight of sulfur and 4 to 25% by weight of nickel based on the final catalyst.

2. The method according to claim 1 wherein said macroporous silica support is a silica gel bead having incorporated powdered silica and having a pore structure such that at least 15% of the pores have an average diameter of at least 100 angstroms.

3. The method according to claim 1 wherein said catalyst is one prepared by treatment of a nickel sulfate impregnated-macroporous silica support, with hydrogen at 1000° F.

4. The method according to claim 1 wherein said catalyst is one containing approximately 13% Ni and 1.6% sulfur by weight based on the final catalyst.

5. The method according to claim 1 wherein said catalyst comprises silica gel beads having at least about 10% of the pores therein of average diameter of approximately 160 angstroms.

6. The method according to claim 1 wherein the hydrogenation is effected at a temperature in the range of 235-250° F. and at a hydrogen pressure of about 50 p.s.i.g.

7. The method according to claim 1 wherein said operating conditions are selected within the defined range so as to convert polyunsaturate groups in the glyceride to a lower degree of unsaturation without producing substantial quantities of total saturates.

8. In the method for the continuous, selective hydrogenation a charge consisting of edible fats and oils by contact with a fixed bed of macroporous silica-supported nickel-sulfur catalyst in which the nickel component is in the range of 4 to 25 percent by weight and the sulfur is present in the range of 0.13 to 4.99 weight percent based on the final catalyst, said sulfur being derived from nickel sulfate by hydrogen reduction, and in which said contact is effected at conditions including a temperature in the range of 100° to 400° F., a hydrogen pressure of 10 to 150 p.s.i.g. and a liquid hourly space velocity in the range of 0.1 to 4, the improvement comprising pretreating said charge for at least two hours to no more than six hours at a temperature in the range of 220° to 350° F. and at a total pressure of less than 0.25 atmosphere absolute, and recovering pretreated charge containing no more than 40 parts per million of water and having a peroxide value of less than 20.

9. The method of claim 8 wherein said charge has been bleached prior to said pretreat.

References Cited in the file of this patent
UNITED STATES PATENTS

| 2,111,573 | Schuman | Mar. 22, 1938 |
| 2,123,332 | Godfrey et al. | July 12, 1938 |
| 2,123,342 | Paterson | July 12, 1938 |
| 2,468,799 | Ziels et al. | May 3, 1949 |
| 2,513,529 | Stejskal | July 4, 1950 |
| 2,674,634 | Greensfelder et al. | Apr. 6, 1954 |
| 2,852,541 | Kaufmann | Sept. 16, 1958 |